US012573524B2

(12) United States Patent
Tanigawa et al.

(10) Patent No.: US 12,573,524 B2
(45) Date of Patent: Mar. 10, 2026

(54) SILVER ELECTRODE AND METHOD OF MANUFACTURING SILVER ELECTRODE

(71) Applicant: KANEKA CORPORATION, Osaka (JP)

(72) Inventors: Satoko Tanigawa, Osaka (JP); Takashi Kuchiyama, Osaka (JP)

(73) Assignee: KANEKA CORPORATION, Osaka (JP)

( * ) Notice: Subject to any disclaimer, the term of this patent is extended or adjusted under 35 U.S.C. 154(b) by 184 days.

(21) Appl. No.: 18/263,512

(22) PCT Filed: Dec. 3, 2021

(86) PCT No.: PCT/JP2021/044493

§ 371 (c)(1),
(2) Date: Jul. 28, 2023

(87) PCT Pub. No.: WO2022/163127

PCT Pub. Date: Aug. 4, 2022

(65) Prior Publication Data

US 2024/0105357 A1 Mar. 28, 2024

(30) Foreign Application Priority Data

Feb. 1, 2021 (JP) ................................ 2021-014503

(51) Int. Cl.
*H01B 5/14* (2006.01)
*G01N 27/30* (2006.01)
*H01B 13/00* (2006.01)

(52) U.S. Cl.
CPC ........... *H01B 5/14* (2013.01); *H01B 13/0036* (2013.01); *G01N 27/30* (2013.01)

(58) Field of Classification Search
CPC ....... H01M 4/34; C25B 11/042; G01N 27/30; H01B 1/02
See application file for complete search history.

(56) References Cited

FOREIGN PATENT DOCUMENTS

| | | |
|---|---|---|
| JP | 2014139291 A | 7/2014 |
| JP | 2020180351 A | 11/2020 |

OTHER PUBLICATIONS

English Translation of JP2014139291A, obtained form EPO espacenet Mar. 25, 2025 (Year: 2025).*
English Translation of JP2014139291 obtained form EPO espacenet on Jul. 3, 2025 (Year: 2025).*
International Bureau of WIPO, International Preliminary Report on Patentability Issued in Application No. PCT/JP2021/044493, Jul. 31, 2023, WIPO, 5 pages.

* cited by examiner

*Primary Examiner* — Adam Krupicka
(74) *Attorney, Agent, or Firm* — Alleman Hall LLP

(57) ABSTRACT

The present invention provides a silver electrode having smaller change in resistivity due to temperature change as compared with the related arts, and a method of manufacturing the silver electrode. The silver electrode is configured to have one peak in a range of a diffraction angle 2θ=37.5° to 38.3° in an X-ray diffraction pattern measured by an X-ray diffractometer using a CuKα1 ray, and a change rate of the diffraction angle of the peak after heated at 150° C. for 30 minutes is less than or equal to 0.5%. In this way, the silver electrode has smaller change in resistivity due to temperature change as compared with the related arts.

8 Claims, 9 Drawing Sheets

CROSS-SECTIONAL VIEW TAKEN ALONG LINE A-A

CROSS-SECTIONAL VIEW TAKEN ALONG LINE B-B

SILVER ELECTRODE AND METHOD OF MANUFACTURING SILVER ELECTRODE

TECHNICAL FIELD

The present invention relates to a silver electrode and a method of manufacturing the silver electrode.

BACKGROUND ART

Conventionally, in an electronic device having a built-in sensor, such as a smartphone or a smartwatch, a silver electrode having lower resistance than other metals is used in the sensor or the like in order to ensure a high detection speed.

As a method of forming the silver electrode, there is a vacuum vapor deposition method (for example, Patent Document 1).

Specifically, in the vacuum vapor deposition method, using a vacuum vapor deposition apparatus, silver as a vapor deposition source is vaporized into a gaseous state in an evaporation chamber or a film formation chamber, and the gaseous silver is vapor-deposited on a surface of a glass substrate from a nozzle facing a substrate in the film formation chamber, thereby forming a silver layer on the substrate to form a silver electrode.

PRIOR ART DOCUMENTS

Patent Documents

Patent Document 1: JP 2020-180351 A

DISCLOSURE OF INVENTION

Technical Problem

A silver electrode having a silver layer formed by the vacuum vapor deposition method has a low resistivity at room temperature, but the resistivity fluctuates with temperature change. Therefore, the resistivity may change due to body temperature or heat generation of the battery, and an error may occur in the sensitivity of the sensor. In such a case, the error is corrected by software in a conventional electronic device, but there is a limit to the correction by software, and it is preferable that the error is as small as possible.

Therefore, an object of the present invention is to provide a silver electrode having smaller change in resistivity due to temperature change as compared with the related arts, and a method of manufacturing the silver electrode.

Solution to Problem

One aspect of the present invention for solving the above problems is a silver electrode including a substrate and a silver layer laminated on the substrate, the silver electrode having one peak in a range of diffraction angle 2θ=37.5° to 38.3° in an X-ray diffraction pattern measured by an X-ray diffractometer using a CuKα1 ray, wherein a change rate of the diffraction angle of the peak after heated at 150° C. for 30 minutes is less than or equal to 0.5%.

According to this aspect, the silver electrode is structurally less dependent on temperature change and has excellent thermal stability.

A preferred aspect is that both a temperature coefficient at 70° C. and a temperature coefficient at 190° C. are less than 0.00001.

A preferred aspect is that a temperature coefficient in a range from 70° C. to 190° C. is less than 0.00001.

A preferred aspect is that a resistivity at a frequency of 10 kHz is 1.1 times or less compared with a resistivity at a frequency of 1 kHz.

A preferred aspect is that the silver electrode further includes: a protective layer; and a cross sectional structure in which the protective layer covers a surface of the silver layer, the protective layer including at least one of a 1,2,2,6,6-pentaalkylpiperidinyl group and a 2,2,6,6-tetraalkylpiperidinyl group.

A preferred aspect is that the silver electrode further includes silver particles on the silver layer, the silver particles having an average particle size larger than an average film thickness of the silver layer.

A preferred aspect is that an average film thickness of the silver layer is 500 nm or less.

A preferred aspect is a silver electrode wherein an oxidizing agent including silver is reduced by a reducing agent including an organic compound with the oxidizing agent in contact with the substrate, thereby the silver layer being laminated on the substrate, wherein the substrate is a copper body, wherein an alloy layer including a copper component and a silver component is formed in an interface between the substrate and the silver layer, and wherein a protective layer including a component of the reducing agent is laminated on a surface of the silver layer.

A preferred aspect is that in the alloy layer, a ratio of a silver component to a copper component is 2/3 or more and 3/2 or less.

A preferred aspect is that when an electron beam diffraction image of the alloy layer is acquired, the pattern of the acquired electron beam diffraction image is consistent with that of a simulated pattern of an electron beam diffraction image of an alloy belonging to a space group Fm-3m and having the ratio of a copper component to a silver component is 1 to 1.

A preferred aspect is that an average film thickness of the alloy layer is 30% or more and 60% or less of an average film thickness of the silver layer.

A preferred aspect is that a residual layer including a component derived from the reducing agent is formed in an interface between the alloy layer and the silver layer.

The "component derived from the reducing agent" as used herein includes not only a component generated by reaction when silver oxide is reduced by a reducing agent but also a component of an unreacted reducing agent. The same applies hereinafter.

A preferred aspect is that void regions adjacent to the silver layer are present in an interface between the alloy layer and the silver layer, and at least a part of an inner wall of each of the void regions is constituted by the residual layer.

A preferred aspect is that the oxidizing agent is silver oxide.

The present inventors have made intensive studies on a silver layer formed by the vacuum vapor deposition method and found that, distortion occurs in the silver layer when silver is deposited on a substrate, and internal stress occurs due to the distortion. The present inventors found that in the silver layer formed by the vacuum vapor deposition method, when the temperature increases, residual stress of the silver layer tends to relax, and the fluctuation in resistivity tends to increase.

Therefore, the present inventors search for a method of forming a silver layer by directly reducing silver oxide with a reducing agent instead of using the vacuum vapor deposition method. As the result, the present inventors found that by using a hindered amine light stabilizer which is conventionally used as a light stabilizer for a resin and is not used as a reducing agent for an inorganic metal as a reducing agent, silver oxide can be reduced even at a temperature lower than 200° C. which is said to be a decomposition starting temperature of silver oxide, and furthermore the formed silver layer has small internal stress as well as allows the change in resistivity due to temperature to be small.

One aspect of the present invention derived from this finding is a method of manufacturing a silver electrode, including the steps of: (a) mixing a reducing agent and silver oxide to form a mixture; (b) coating a substrate with the mixture; and (c) heating the substrate coated with the mixture at a first heating temperature, wherein the reducing agent is a hindered amine compound having at least one of a 1,2,2,6,6-pentaalkylpiperidinyl group and a 2,2,6,6-tetraalkylpiperidinyl group.

According to this aspect, silver oxide can be reduced even at a low temperature and a silver electrode allowing the change in resistivity due to temperature to be small can be manufactured.

A preferred aspect is that the first heating temperature is lower than 200° C.

According to this aspect, a silver layer can be formed at a temperature lower than a normal decomposition starting temperature of silver oxide.

When a silver layer is formed using the vacuum vapor deposition method, a film formation chamber is required to be depressurized to a vacuum state every time a substrate is replaced, resulting in a problem that film formation takes a long time.

In addition, the silver layer formed by the vacuum vapor deposition method has a problem of easily being peeled off from the substrate due to poor adhesion to the substrate and weak strength of the layer.

Furthermore, the silver layer formed by the vacuum vapor deposition method has a problem of easily being oxidized by light or heat and therefore being easily corroded and discolored.

Therefore, the present inventors consider that by mixing and heating silver oxide and a reducing agent to directly reduce silver oxide to silver as described above, a film can be formed in a shorter time as compared with the vacuum vapor deposition method, as well as the density of the silver layer is enhanced and the film strength is increased.

The present inventors have made intensive studies on a method of reducing silver oxide and found that a prescribed pretreatment of silver oxide accelerates a rate of a reduction reaction as compared with a case where silver oxide is simply mixed with a reducing agent and heated.

In order to form a silver layer in a shorter time as compared with the related arts, a preferred aspect is that the method includes pretreating powdered silver oxide, wherein step (a) includes mixing the pretreated silver oxide with the reducing agent to form the mixture, and wherein the step of pretreating includes exposing the silver oxide to a pretreatment solvent having a boiling point lower than the first heating temperature.

A preferred aspect is that the step of pretreating includes: immersing the silver oxide in the pretreatment solvent; and removing a part or all of the pretreatment solvent.

A preferred aspect is that the pretreatment solvent is a volatile organic solvent.

A preferred aspect is that the pretreatment solvent is at least one solvent selected from the group consisting of acetone, toluene, ethanol, acetonitrile, and water.

A preferred aspect is that the reducing agent is a hindered amine light stabilizer.

A preferred aspect is that the reducing agent contains a hindered amine compound having two or more of at least one of the 2,2,6,6-tetraalkylpiperidinyl group and a 1,2,2,6,6-pentaalkylpiperidinyl group and having a molecular weight of 700 or less.

A preferred aspect is that step (c) includes: reducing the silver oxide with the reducing agent to form a silver layer on the substrate; and covering a surface of the silver layer with a protective layer formed of a component derived from the reducing agent.

According to this aspect, in the heating step, a residue of the reducing agent causes bleed-out on the surface of the silver layer, and the protective layer having the component derived from the reducing agent is formed to cover the silver layer, and therefore the layer strength is reinforced by the protective layer, and the silver layer is more hardly peeled off from the substrate.

Effect of Invention

According to the silver electrode of the present invention, the stable structure allows the change in resistivity due to temperature to be smaller as compared with the related arts.

According to the method of manufacturing the silver electrode of the present invention, it is possible to manufacture a silver electrode allowing the change in resistivity due to temperature to be smaller as compared with the related arts.

BRIEF DESCRIPTION OF DRAWINGS

FIGS. 2A and 2B are explanatory views of the silver electrode of FIG. 1, wherein FIG. 2A is a cross-sectional view taken along line A-A of FIG. 1, and FIG. 2B is a cross-sectional view taken along line B-B of FIG. 1. In order to facilitate understanding, hatching is partially omitted.

FIGS. 7A and 7B are results of SEM observation in the experimental example 1, wherein FIG. 7A is an SEM image in experimental example 1, and FIG. 7B is a drawing obtained by tracing FIG. 7A.

FIGS. 9A and 9B are results of STEM observation in an experimental example 7, wherein FIG. 9A is a secondary electron image at a low magnification, and FIG. 9B is a drawing obtained by tracing FIG. 9A.

FIGS. 10A and 10B are results of STEM observation in the experimental example 7, wherein FIG. 10A is a transmitted electron image at a high magnification, and FIG. 10B is a drawing obtained by tracing FIG. 10A.

BEST MODE FOR CARRYING OUT THE INVENTION

Hereinafter, embodiments of the present invention will be described in detail. Physical properties are based on a standard state of 25° C. and 1 atm unless otherwise specified.

A silver electrode 1 of a first embodiment of the present invention is suitably used in semiconductor devices such as a solar cell module and a power semiconductor, IoT devices such as a smartphone and a smart watch, analysis devices such as an X-ray detector, an optical detector, and an acoustic detector, actuators such as artificial muscles, and the like.

The silver electrode 1 is also suitably used in reflective films such as for an organic EL display or a liquid crystal display, conductive materials such as a wiring line and an electrode, decorative materials, recording materials, and antibacterial materials, and the like.

Figure 1:
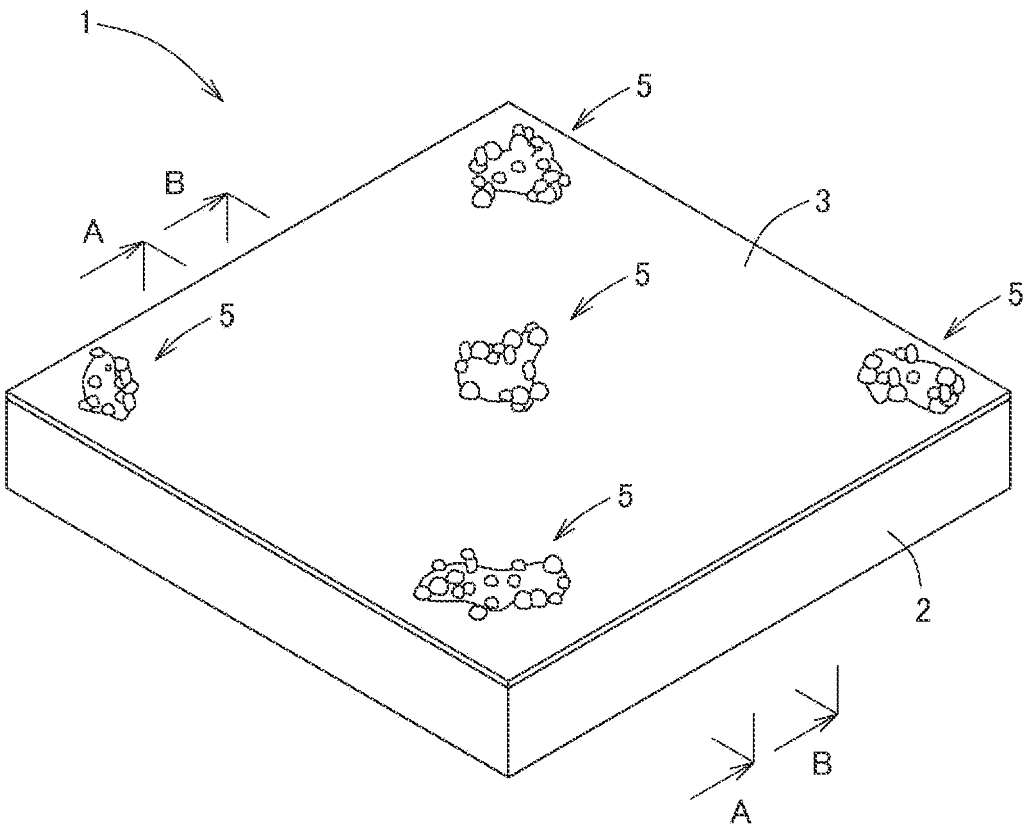
FIG. 1 is a perspective view of a silver electrode of a first embodiment of the present invention.

As shown in FIG. 1, the silver electrode 1 is a substrate with a silver thin film in which a silver thin film layer 3 (silver layer) is laminated on a substrate 2, and a silver particle layer 5 is locally formed.

Figure 2A:
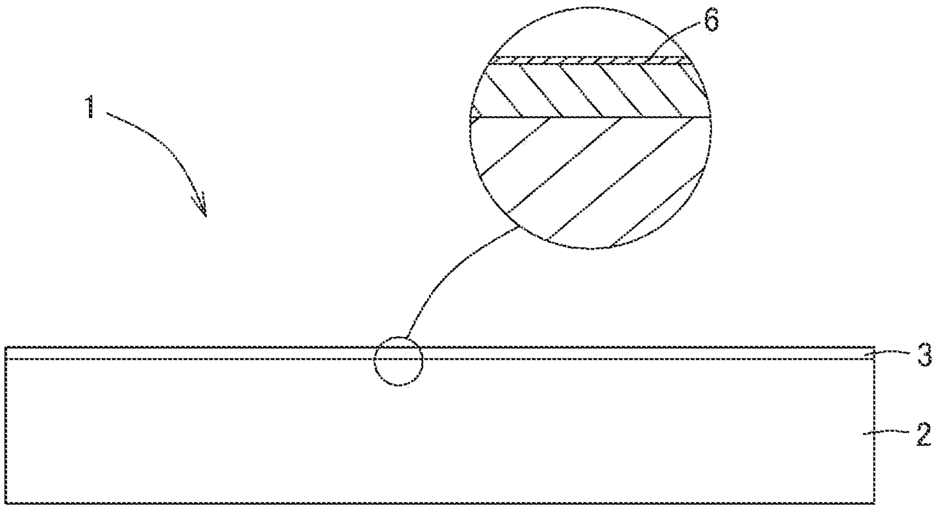
Figure 2B:
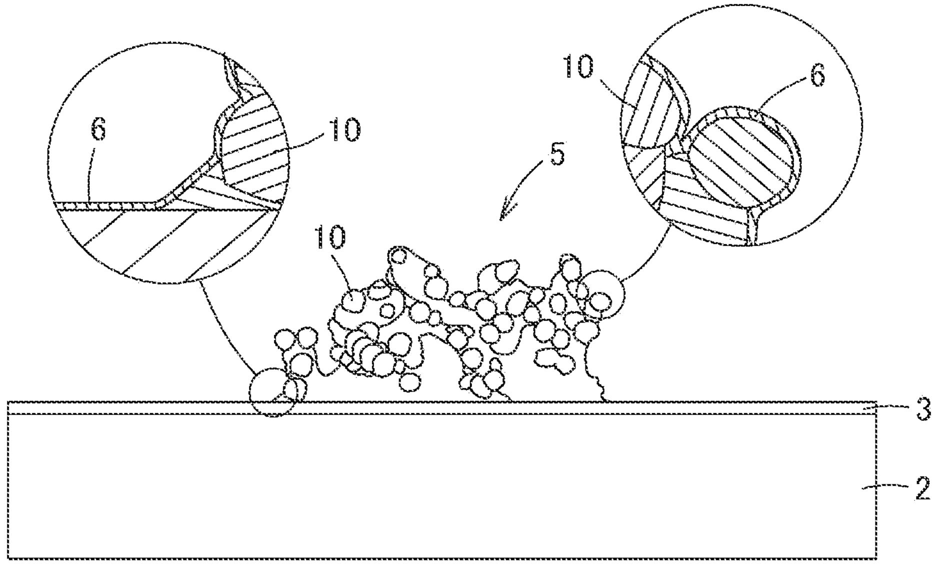

As shown in FIGS. 2A and 2B, the silver electrode 1 has a cross sectional structure in which a protective layer 6 covers a surface of the silver thin film layer 3, and the protective layer 6 extends from the surface of the silver thin film layer 3 to a surface of the silver particle layer 5 laminated on the silver thin film layer 3 to cover surfaces of silver particles 10 constituting the silver particle layer 5.

(Substrate 2)

The substrate 2 is a supporting substrate that spreads in a planar shape and supports the silver thin film layer 3.

The substrate 2 has a plate shape or a film shape, and has a first main surface (surface to be film-formed) and a second main surface.

The substrate 2 is not particularly limited, and an insulating substrate such as a glass substrate or a polyimide film, a metal substrate such as copper, a conductive substrate such as a metal film, or the like can be used.

(Silver Thin Film Layer 3)

The silver thin film layer 3 is a silver thin film layer having silver as a main component.

The term "main component" as used herein refers to a component that accounts for more than 50% of the total.

It is preferable that 80% or more of the entire silver thin film layer 3 is composed of silver, and it is more preferable that 95% or more of the entire silver thin film layer 3 is composed of silver.

The average film thickness of the silver thin film layer 3 is 1 μm or less, and is preferably 50 nm or more and 500 nm or less, and more preferably 150 nm or more and 300 nm or less from the viewpoint of ease of use in a wiring line and the like while securing sufficient conductivity.

The average film thickness of the silver thin film layer 3 can be determined, for example, by observing a cross section of the silver thin film layer 3 with a scanning electron microscope (SEM) image or a transmission electron microscope (TEM) image, and calculating an arithmetic average value at arbitrary three points.

(Silver Particle Layer 5)

As shown in FIG. 2B, the silver particle layer 5 is a particle deposition layer in which the silver particles 10 are deposited. In the silver particle layer 5, the silver particles 10 are crystal-grown in a direction crossing the substrate 2, and the silver particles 10 are three-dimensionally stacked.

The average particle size of the silver particles 10 constituting the silver particle layer 5 is larger than the average film thickness of the silver thin film layer 3, and is preferably 10 μm or less.

The average particle size refers to a number average particle size of secondary particles in which primary particles are aggregated, and refers to primary particles when secondary particles in which primary particles are aggregated are not present.

The average particle size of the silver particles 10 can be calculated, for example, by observing the silver particles with a scanning electron microscope (SEM) image or a transmission electron microscope (TEM) image, and arithmetically averaging the particle sizes of arbitrary 10 or more silver particles 10 appearing in the SEM image or the TEM image. The particle size of the silver particles 10 refers to the diameter of the smallest inclusion circle containing the silver particles 10 in the SEM image or the TEM image.

(Protective Layer 6)

The protective layer 6 is a layer that has photostability and thermal stability and protects the silver thin film layer 3 from light and heat.

The protective layer 6 of the present embodiment is a layer formed from a reducing agent used to form the silver thin film layer 3 in the method of manufacturing the silver electrode 1 to be described later, and is composed of products formed by the reaction of the reducing agent with an oxidizing agent or is composed of the unreacted reducing agent.

The protective layer 6 of the present embodiment contains a compound having at least one of a 2,2,6,6-tetraalkylpiperidinyl group and a 1,2,2,6,6-pentaalkylpiperidinyl group.

The number of 1,2,2,6,6-pentaalkylpiperidinyl groups and 2,2,6,6-tetraalkylpiperidinyl groups in the compound is not particularly limited.

In addition, the number of carbon atoms of the alkyl group in each of the 1,2,2,6,6-pentaalkylpiperidinyl group and the 2,2,6,6-tetraalkylpiperidinyl group constituting this compound is preferably 1 to 4 independently.

The average film thickness of the protective layer 6 is preferably 1 nm or more and 20 nm or less. Within this range, the silver thin film layer 3 can be sufficiently protected from light and heat.

The average film thickness of the protective layer 6 can be obtained, for example, by observing a cross section of the protective layer 6 with a SEM image or a TEM image, and calculating an arithmetic average value at arbitrary three points.

Subsequently, physical properties of the silver electrode 1 of the present embodiment will be described.

The silver electrode 1 has one peak in a range of a diffraction angle $2\theta=37.5°$ to $38.3°$ in an X-ray diffraction pattern measured by an X-ray diffractometer using a $CuK\alpha1$ ray, and a change rate of the diffraction angle $2\theta$ of the peak after heated at 150° C. for 30 minutes is 0% or more and 0.5% or less.

The silver electrode 1 preferably has a crystallite diameter of 0.3 nm or more and 0.4 nm or less.

After the silver electrode 1 is heated at 150° C. for 30 minutes, a change rate of the crystallite diameter after heating to that before heating is preferably 1 or more and 1.15 or less.

The silver electrode 1 preferably has a lattice constant of 0.235 nm or more and 0.245 nm or less.

After the silver electrode 1 is heated at 150° C. for 30 minutes, a change rate of the lattice constant after heating to that before heating is preferably 0.95 or more and 1.05 or less.

The silver electrode 1 preferably has a temperature coefficient less than 0.00001 in the range of 70° C. to 190° C., and more preferably less than 0.000001.

In the silver electrode 1, the resistivity at a frequency of 10 kHz is preferably 0.9 times or more and 1.1 times or less of the resistivity at a frequency of 1 kHz.

In the silver electrode 1, the resistivity is preferably $7.0\times10^{-5}$ Ωcm or less in the range of $1.0\times10^{-18}$ Hz to $1.0\times10^{3}$ kHz.

Next, a method of manufacturing the silver electrode 1 of the first embodiment will be described.

The method of manufacturing the silver electrode 1 of the first embodiment mainly includes a pretreatment step, a mixing step, a coating step, a heating step, and a cleaning step.

First, the pretreatment step is performed in which silver oxide is pretreated with a pretreatment solvent.

The pretreatment step performs an immersion step and a removal step in this order.

In the immersion step, powdered silver oxide and the pretreatment solvent are placed in a closed container, and the silver oxide is immersed in the pretreatment solvent and stirred.

At this time, the maximum particle size of the silver oxide introduced into the closed container is preferably 0.5 μm or more and 10 μm or less.

The maximum particle size of the silver oxide can be excluded by subjecting the silver oxide to a sieve having a known opening diameter to exclude particles having a diameter larger than the opening diameter.

The pretreatment solvent is not particularly limited as long as it has a boiling point lower than the first heating temperature in the heating step to be described later. By using a solvent having a boiling point lower than the first heating temperature as the pretreatment solvent, even when the pretreatment solvent cannot be sufficiently removed in the removal step, the pretreatment solvent can be vaporized in the heating step, and the solvent is less likely to remain in the silver thin film layer 3.

As the pretreatment solvent, for example, at least one solvent selected from a group consisting of acetone, toluene, ethanol, acetonitrile, and water can be used. By using these, a residue of the pretreatment solvent is less likely to remain in the heating step to be described later.

The pretreatment solvent is preferably a solvent having a boiling point of 50° C. or higher and 120° C. or lower.

The pretreatment solvent is preferably an organic solvent having volatility at room temperature. By using the organic solvent having volatility at room temperature, the pretreatment solvent can be removed even by natural drying at room temperature in the removal step to be described later, and the reaction time can be further shortened.

Subsequently, most of the pretreatment solvent is separated and removed from the silver oxide immersed in the pretreatment solvent in the closed container (removal step).

In the present embodiment, decantation is performed one or more times to remove most of the pretreatment solvent, followed by drying in a dryer at a predetermined drying temperature to substantially remove the pretreatment solvent.

The drying temperature at this time is not particularly limited as long as it is a temperature at which the pretreatment solvent volatilizes. The drying temperature is preferably 100° C. or lower from the viewpoint of suppressing aggregation of silver oxide.

When the pretreatment step is performed and the pretreatment of silver oxide is completed, the pretreated silver oxide is mixed with a reducing agent to form a mixture (mixing step).

At this time, the reducing agent is an amine reducing agent, and is preferably a hindered amine light stabilizer having at least one of a 1,2,2,6,6-pentaalkylpiperidinyl group and a 2,2,6,6-tetraalkylpiperidinyl group, and more preferably an N—CH3 type or N—H type hindered amine light stabilizer.

By using a hindered amine light stabilizer as the reducing agent, the silver thin film layer 3 can be provided with a surface corrosion suppressing effect.

Examples of the N—CH3 type hindered amine light stabilizer include Bis(1,2,2,6,6-pentamethyl-4-piperidyl) sebacate.

Examples of the N—H type hindered amine light stabilizer include Tetrakis(1,2,2,6,6-pentamethyl-4-piperidyl) butane-1,2,3,4-tetracarboxylate, Tetrakis(2,2,6,6-tetramethyl-4-piperidyl) butane-1,2,3,4-tetracarboxylate, and Bis (2,2,6,6-tetramethyl-4-piperidyl) sebacate.

From another viewpoint, the reducing agent preferably contains a hindered amine compound having two or more of at least one of a 2,2,6,6-tetraalkylpiperidinyl group and a 1,2,2,6,6-pentaalkylpiperidinyl group and having a molecular weight of 700 or less.

In the hindered amine compound, the carbon at position 4 of the piperidine ring of the 1,2,2,6,6-pentaalkylpiperidinyl group or the 2,2,6,6-tetraalkylpiperidinyl group preferably forms an ester bond with a carboxylic acid.

The number of 1,2,2,6,6-pentaalkylpiperidinyl groups and 2,2,6,6-tetraalkylpiperidinyl groups in the hindered amine compound is not particularly limited.

The number of carbon atoms of the alkyl group in each of the 1,2,2,6,6-pentaalkylpiperidinyl group and the 2,2,6,6-tetraalkylpiperidinyl group is preferably 1 to 4 independently.

The reducing agent may be solid or liquid at room temperature, but preferably has a melting point lower than the first heating temperature in the heating step to be described later.

As long as the melting point of these amine compounds is lower than the first heating temperature, even though the reducing agent is solid at the time of heating together with silver oxide in the heating step to be described later, the reduction of the silver oxide can be efficiently performed. That is because the reducing agent melts and becomes liquid before reaching the first heating temperature, and as the result of that the contact area with the silver oxide increases.

In the present embodiment, the reducing agent includes an amine compound represented by the following structural formula (1).

[Chemical formula 1]

(1)

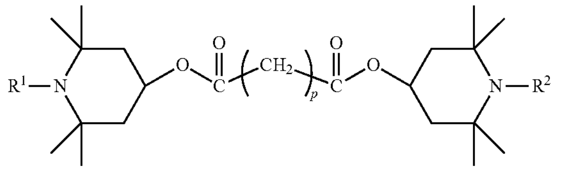

In the structural formula (1), $R^1$ and $R^2$ are each independently a hydrogen atom or a methyl group, and p is a positive integer of 1 or more and 18 or less.

Subsequently, the mixed mixture in the mixing step is coated onto an arbitrary range on a first main surface of the substrate 2 (coating step).

The coating method at this time is not particularly limited. Examples thereof include a casting method, a roll coating method, a bar coating method, a die coating method, a spin coating method, a spray coating method, and a dip coating method.

Subsequently, the substrate 2 coated with the mixture is placed in a heating device and heated at the first heating temperature, and the silver oxide as an oxidizing agent is reduced by the reducing agent to form the silver thin film layer 3 on the substrate 2 (heating step).

The first heating temperature at this time is not particularly limited as long as the reaction between the silver oxide and the reducing agent proceeds, but from the viewpoint of reducing the silver oxide in a short time, the first heating temperature is preferably 100° C. or more and less than 200° C., and more preferably 120° C. or more and 180° C. or less.

Subsequently, the substrate 2 on which the silver thin film layer 3 is formed in the heating step is cleaned with a cleaning solvent (cleaning step) to form the silver electrode 1.

The cleaning solvent used at this time is not particularly limited as long as it does not substantially react with silver, and for example, a volatile organic solvent such as acetone can be used.

According to the silver electrode 1 of the present embodiment, since a change rate of the diffraction angle the peak is 0.5% or less after heated at 150° C. for 30 minutes, structurally, dependence on temperature change is small, and thermal stability is excellent.

According to the silver electrode 1 of the present embodiment, since both the temperature coefficient at 70° C. and the temperature coefficient at 190° C. are less than 0.00001, thermal stability can be achieved at 70° C. and 190° C.

According to the silver electrode 1 of the present embodiment, since temperature coefficients in the range of 70° C. to 190° C. are less than 0.00001, thermal stability, high thermal conductivity, and thermal diffusivity can be achieved in the range of 70° C. to 190° C.

According to the silver electrode 1 of the present embodiment, the resistivity at a frequency of 10 kHz is 1.1 times or less of the resistivity at a frequency of 1 kHz, and the fluctuation of resistivity with respect to the change of frequency is small. Therefore, stability with respect to frequency is excellent, and low frequency dependence can be achieved.

According to the silver electrode 1 of the present embodiment, since the surface of the silver thin film layer 3 is covered with the protective layer 6, the layer strength is reinforced and the binding property with the substrate 2 is improved, so that the silver thin film layer 3 is more hardly peeled off from the substrate 2. Oxidation and the like of the silver thin film layer 3 can be suppressed.

According to the silver electrode 1 of the present embodiment, the surface of the silver thin film layer 3 is covered with the protective layer 6 containing a compound having a 2,2,6,6-tetraalkylpiperidinyl group or a 1,2,2,6,6-pentaalkylpiperidinyl group. Therefore, as compared with a case where the silver thin film layer 3 is exposed, the silver thin film layer 3 is provided with an effect of suppressing surface corrosion due to heat and light, resulting in more excellent corrosion resistance and improved durability than the related arts.

According to the silver electrode 1 of the present embodiment, since the protective layer 6 is a layer derived from the reducing agent, no separate protective layer is required, and the effect of suppressing oxidation of the silver thin film layer 3 can be achieved at low cost.

According to the method of manufacturing the silver electrode 1 of the present embodiment, a hindered amine compound having at least one of a 2,2,6,6-tetraalkylpiperidinyl group and a 1,2,2,6,6-pentaalkylpiperidinyl group is used as the reducing agent. Therefore, it is possible to reduce the silver oxide even at a low temperature and to manufacture the silver electrode 1 having smaller change in resistivity due to temperature change.

According to the method of manufacturing the silver electrode 1 of the present embodiment, the silver thin film layer 3 can be formed by reducing the silver oxide at a temperature lower than a general decomposition temperature of silver oxide, and the silver electrode 1 can be easily formed.

According to the method of manufacturing the silver electrode 1 of the present embodiment, heating is performed at a low temperature which is to be the first heating temperature lower than 200° C. and lower than the general decomposition temperature of silver oxide in order to react the reducing agent with the silver oxide. Therefore, the reducing agent is hardly thermally decomposed by heating.

According to the method of manufacturing the silver electrode 1 of the present embodiment, the silver oxide and the reducing agent are mixed and heated to reduce the silver oxide and form the silver thin film layer 3. Therefore, as compared with a case where a silver thin film layer is formed by the vacuum vapor deposition method, devices are not complicated, and the silver thin film layer 3 can be easily formed in a short period of time.

According to the method of manufacturing the silver electrode 1 of the present embodiment, since the silver oxide is exposed to the pretreatment solvent having a boiling point lower than the first heating temperature in the pretreatment step, the silver thin film layer 3 can be formed in a short time as compared with a case where the pretreatment step is not performed, and a residue of the solvent is less likely to remain in the heating step.

According to the method of manufacturing the silver electrode 1 of the present embodiment, the pretreatment step includes the immersion step of immersing the silver oxide in the pretreatment solvent and the removal step of removing a part or all of the pretreatment solvent. Therefore, even when the viscosity of the pretreatment solvent is low or the pretreatment solvent is separated from the reducing agent, the pretreatment solvent is removed, so that the presence of the pretreatment solvent is less likely to hinder the coating of the mixture onto the substrate 2, and the mixture can be easily coated onto the substrate 2.

Next, a silver electrode 101 of a second embodiment of the present invention will be described. The same components as those of the silver electrode 1 of the second embodiment are denoted by the same reference numerals, and description thereof is omitted. The same applies hereinafter.

Figure 3:
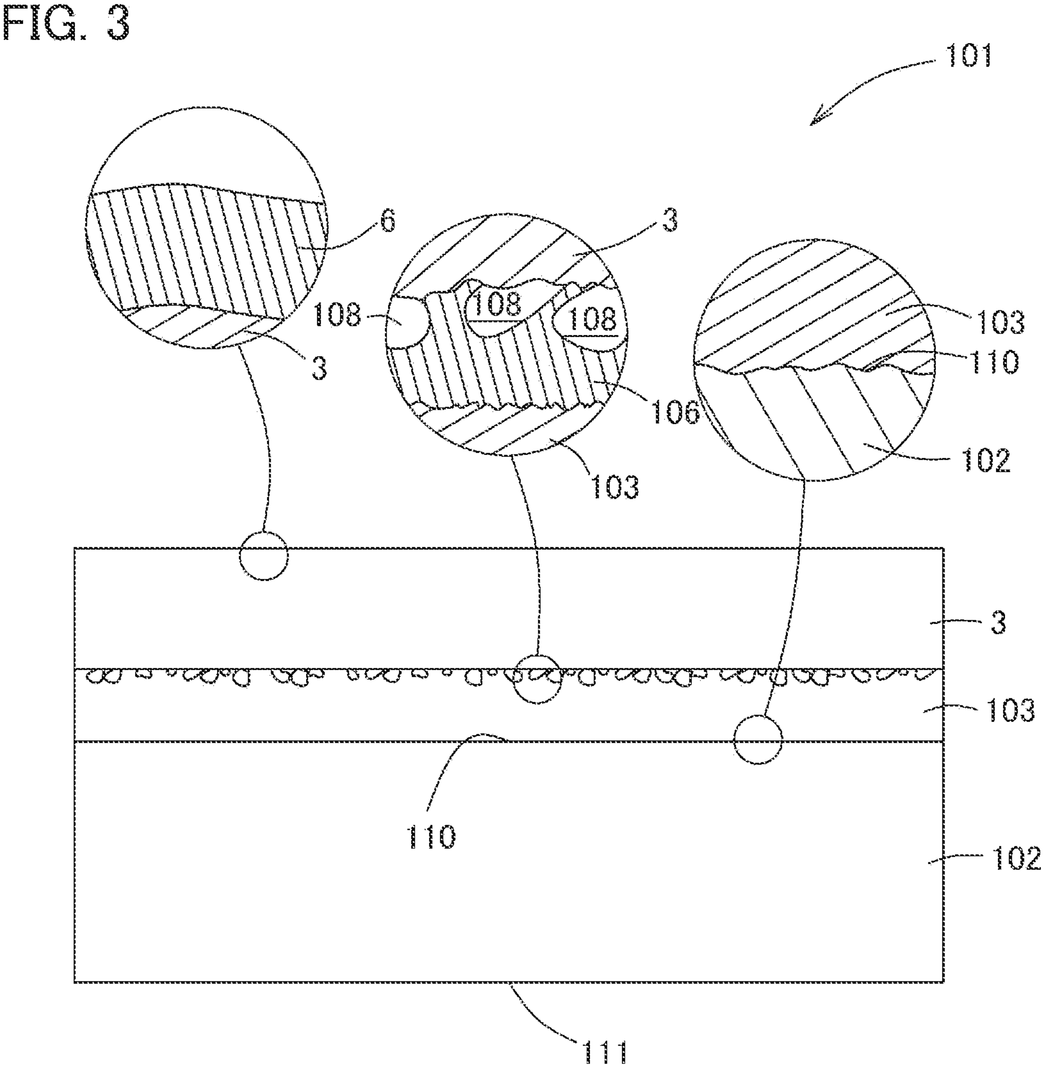
FIG. 3 is a cross-sectional view of a silver electrode of a second embodiment of the present invention. In order to facilitate understanding, hatching is partially omitted.

As shown in FIG. 3, the silver electrode 101 of the second embodiment has a multilayer structure in which an alloy layer 103 and a silver thin film layer 3 are laminated in this order on a copper plate 102 (copper body, substrate). That is, in the silver electrode 101, the alloy layer 103 is interposed between the copper plate 102 and the silver thin film layer 3.

In the silver electrode 101, as in an enlarged view of FIG. 3, a residual layer 106 is formed which is the interface between the alloy layer 103 and the silver thin film layer 3 and is formed on the surface of the alloy layer 103, and a protective layer 6 is formed on the surface of the silver thin film layer 3. As shown in FIG. 3, the silver electrode 101 has a plurality of void regions 108 in the interface between the alloy layer 103 and the silver thin film layer 3.

(Copper Plate 102)

The copper plate 102 is a plate-shaped body made of copper and spreading in a planar shape, and is a supporting substrate having a first main surface 110 and a second main surface 111 and supporting the silver thin film layer 3 on the first main surface 110.

The copper plate 102 has different surface roughness between the first main surface 110 and the second main surface 111, the first main surface 110 has a surface unevenness, and the first main surface 110 has a surface roughness greater than that of the second main surface 111.

(Alloy Layer 103)

The alloy layer 103 is a copper-silver alloy layer formed on the copper plate 102 and containing a copper component and a silver component.

In the alloy layer 103, the ratio of the silver component to the copper component is preferably 2/3 or more and 3/2 or less.

The average film thickness of the alloy layer 103 is thinner than the average film thickness of the silver thin film layer 3, and is preferably 10% or more and 90% or less, and more preferably 20% or more and 60% or less of the average film thickness of the silver thin film layer 3.

The average film thickness of the alloy layer 103 can be obtained, for example, by observing a cross section of the alloy layer 103 with a scanning electron microscope (SEM) image or a transmission electron microscope (TEM) image, and calculating an arithmetic average value at arbitrary three points.

The alloy layer 103 preferably contains a copper component and a silver component in a ratio of 1 to 1 and has a crystal structure of a space group Fm-3m.

(Residual Layer 106)

The residual layer 106 is a layer formed on the surface of the alloy layer 103.

The residual layer 106 has a component derived from a reducing agent used in a method of manufacturing the silver electrode 101 to be described later, and is mainly composed of a residue generated during a manufacturing process of the silver electrode 101.

The residual layer 106 of the present embodiment contains a carbon element derived from the reducing agent.

The average film thickness of the residual layer 106 is preferably 1 nm or more and 20 nm or less. Within this range, electric conduction between the alloy layer 103 and the silver thin film layer 3 is less likely to be inhibited.

(Void Region 108)

The void regions 108 are voids formed from gaps between silver particles constituting the silver thin film layer 3 or gaps between the silver particles and the residual layer 106.

Each of the void regions 108 is disposed to be close to the silver thin film layer 3 side and adjacent to the silver thin film layer 3.

The void regions 108 of the present embodiment are preferably 0.5 nm or more and 30 nm or less.

Next, a method of manufacturing the silver electrode 101 of the second embodiment will be described.

In the method of manufacturing the silver electrode 101 of the second embodiment, an oxidizing agent containing silver is reduced by a reducing agent containing an organic compound in a state where the oxidizing agent is in contact with the copper plate 102, and the silver thin film layer 3 is laminated on the copper plate 102.

The oxidizing agent is not particularly limited as long as it contains silver and functions as an oxidizing agent in relation to the reducing agent. Examples of the oxidizing agent include silver oxide, silver carbonate, silver acetate, and acetylacetone silver complexes.

In the following description, a case where silver oxide is used as an example of the oxidizing agent will be described.

The method of manufacturing the silver electrode 101 of the second embodiment mainly includes a mixing step, a coating step, a heating step, and a cleaning step, and a pretreatment step may be performed as in the first embodiment according to the necessity.

First, silver oxide is mixed with a reducing agent to form a mixture (mixing step).

At this time, the reducing agent is an amine reducing agent, and the same reducing agent used in the mixing step of the first embodiment can be used.

Subsequently, the mixture mixed in the mixing step is applied onto an arbitrary area on the first main surface of the copper plate 102 (coating step).

Subsequently, the copper plate 102 coated with the mixture is placed in a heating device and heated at the first heating temperature, and the silver oxide is reduced by the reducing agent to form the silver thin film layer 3 on the copper plate 102 (heating step).

At this time, on the surface of the copper plate 102, the copper component diffuses to the silver thin film layer 3 side to form the alloy layer 103 with the silver thin film layer 3, and on the surface of the alloy layer 103, a residual layer 106 is formed by some of the reducing agent that has reacted with the oxidizing agent. Further, in the interface between the alloy layer 103 and the silver thin film layer 3, void regions 108 according to gaps between silver particles constituting the silver thin film layer 3 or gaps between the silver particles and the copper plate 102 are formed.

Some of the reducing agent reacted with the oxidizing agent or the unreacted reducing agent covers the surface of the silver thin film layer 3 to form a protective layer 6.

Subsequently, the copper plate 102 on which the silver thin film layer 3 is formed is cleaned with a cleaning solvent (cleaning step).

The cleaning solvent used at this time can be the same as the cleaning solvent used in the cleaning step of the first embodiment.

According to the silver electrode 101 of the second embodiment, the alloy layer 103 is formed on the interface between the copper plate 102 and the silver thin film layer 3. Therefore, interface resistance between the copper plate 102 and the silver thin film layer 3 can be reduced.

In the first embodiment described above, a plate-shaped body or a film-shaped body is used as the substrate 2, and the silver thin film layer 3 is formed on the first main surface of the substrate 2, but the present invention is not limited thereto. A casing of a personal computer or the like may be used as the substrate 2, and the silver thin film layer 3 may be formed on the surface for film formation, the surface being located in the casing of the personal computer.

In the first embodiment described above, the silver thin film layer 3 is formed on the first main surface of the substrate 2, but the present invention is not limited thereto. The silver thin film layer 3 may be formed on both surfaces of the substrate 2. That is, the silver thin film layer 3 may be formed on the first main surface and the second main surface of the substrate 2.

Similarly, in the second embodiment described above, the silver thin film layer 3 is formed on the first main surface 110 of the copper plate 102, but the present invention is not limited thereto. The silver thin film layer 3 may be formed on both surfaces 110, 111 of the copper plate 102. That is, the silver thin film layer 3 may be formed on the first main surface 110 and the second main surface 111 of the copper plate 102.

In the first embodiment described above, decantation is performed to remove most of the pretreatment solvent in the removal step, followed by drying in a dryer to substantially remove the pretreatment solvent, but the present invention is not limited thereto. The method of removing the pretreatment solvent is not particularly limited. For example, when the pretreatment solvent is a volatile solvent, the pretreatment solvent may be removed only by drying with a dryer, or may be removed by volatilization in the air or in a vacuum chamber at room temperature.

In the first embodiment described above, the silver oxide is immersed in the pretreatment solvent and stirred to expose the silver oxide to the pretreatment solvent, but the present invention is not limited thereto, and the method of exposing the silver oxide to the pretreatment solvent is not particularly limited. For example, the silver oxide may be exposed to the pretreatment solvent by spraying the pretreatment solvent onto the silver oxide.

In the first embodiment described above, the pretreatment step is performed, but the present invention is not limited thereto, and the pretreatment step may be omitted.

In the second embodiment described above, a case where the copper plate 102 is used as the copper body supporting the silver thin film layer 3 has been described, but the present invention is not limited thereto. The copper body may be a copper layer laminated on a support. For example, the copper body may be a glass substrate on which a copper layer is laminated.

In the second embodiment described above, a case where the plate-shaped copper plate 102 is used as the copper body supporting the silver thin film layer 3 has been described, but the present invention is not limited thereto. It may be a film-shaped body or a copper sheet, such as a copper foil or a sheet-shaped body.

In the embodiments described above, each component can be freely replaced or added between the embodiments as long as it is included in the technical scope of the present invention.

EXAMPLES

Hereinafter, the present invention will be specifically described with each experimental example as an example, but the present invention is not limited to these experimental examples.

Experimental Example 1

In the experimental example 1, 100 parts by weight of a silver oxide powder (manufactured by Tokyo Chemical Industry Co., Ltd., silver oxide special grade) and 100 parts by weight of liquid Bis sebacate (1,2,2,6,6-pentamethyl-4-piperidyl; manufactured by ADEKA Corporation, ADK STAB LA-72) are mixed to obtain a paste-like mixture.

The resulting mixture is applied onto a range of 5 cm×5 cm on a glass substrate and held at 150° C. for 60 minutes. Thereafter, the surface of the mixture on the substrate is cleaned with acetone to obtain a silver thin film layer adhered to the substrate and having an average film thickness of 100 nm to 200 nm.

The silver electrode thus obtained is designated as the experimental example 1.

Experimental Example 2

In the experimental example 2, a silver target is used in a vacuum vapor deposition apparatus to form a silver thin film layer having an average film thickness of 150 nm on a glass substrate.

The silver electrode thus obtained is designated as the experimental example 2.

(Powder X-Ray Diffraction Measurement)

The silver electrodes of the experimental example 1 and the experimental example 2 are subjected to XRD measurement at room temperature, then heated at 150° C. for 30 minutes, and then subjected to XRD measurement again at room temperature.

The powder X-ray diffraction measurement (hereinafter, also referred to as XRD measurement) is performed using a powder X-ray diffractometer (manufactured by BRUKER, model number: D2 PHASER 2nd Gen) under conditions of a CuKα ray, output 40 kV, and 40 mA.

A diffraction spectrum obtained by XRD measurement is subjected to Rietveld analysis using crystal structure analysis software DIFFRAC.SUITE to calculate a lattice constant.

The crystal structure is a cubic crystal structure of a space group Fm-3m having a space group number 225.

A crystallite diameter D is calculated applying the Scherrer equation to the half width of a peak near 2θ=37.90° of the diffraction spectrum obtained by XRD measurement.

The Scherrer equation is represented by $D=0.94\lambda/(\beta\cos\theta)$, where λ represents the measured X-ray wave length (0.15418 nm), β represents the half-width, and θ represents the Bragg angle.

(Temperature Coefficient Test)

In the silver electrodes of the experimental example 1 and the experimental example 2, electrical resistivity is measured in 1° C. increments from room temperature to 190° C., and a temperature coefficient at each measurement temperature is calculated by differentiating the electrical resistivity at each measurement temperature. The temperature coefficient at each measurement temperature is arithmetically averaged to calculate an average temperature coefficient.

The electrical resistivity is calculated as follows.

Using a probe type step profiler (manufactured by Kosaka Laboratory Ltd., ET3000i), steps at the boundary between the substrate and the silver thin film layer are measured at arbitrary three measurement points within a range of 100 μm or less from the boundary between a side surface of the silver thin film layer and the substrate in the sample, and an arithmetic average value of the film thickness of the silver thin film layer at the three measurement points is calculated. Subsequently, the sheet resistance at each of the three measurement points is measured using a four-point probe method, and the arithmetic average value of the sheet resistance is calculated. The calculated arithmetic average value (Ω/square) of the sheet resistance is multiplied by the arithmetic average value (nm) of the film thickness to calculate the electrical resistivity (Ω·cm).

(Spectroscopic Ellipsometry Measurement)

A dielectric function in a frequency range of $1.0\times10^{-18}$ Hz to $1.0\times10^{3}$ kHz is acquired by spectroscopic ellipsometry, and the acquired dielectric function is fitted with a Drude model to calculate resistivity in each frequency range.

Figure 4:
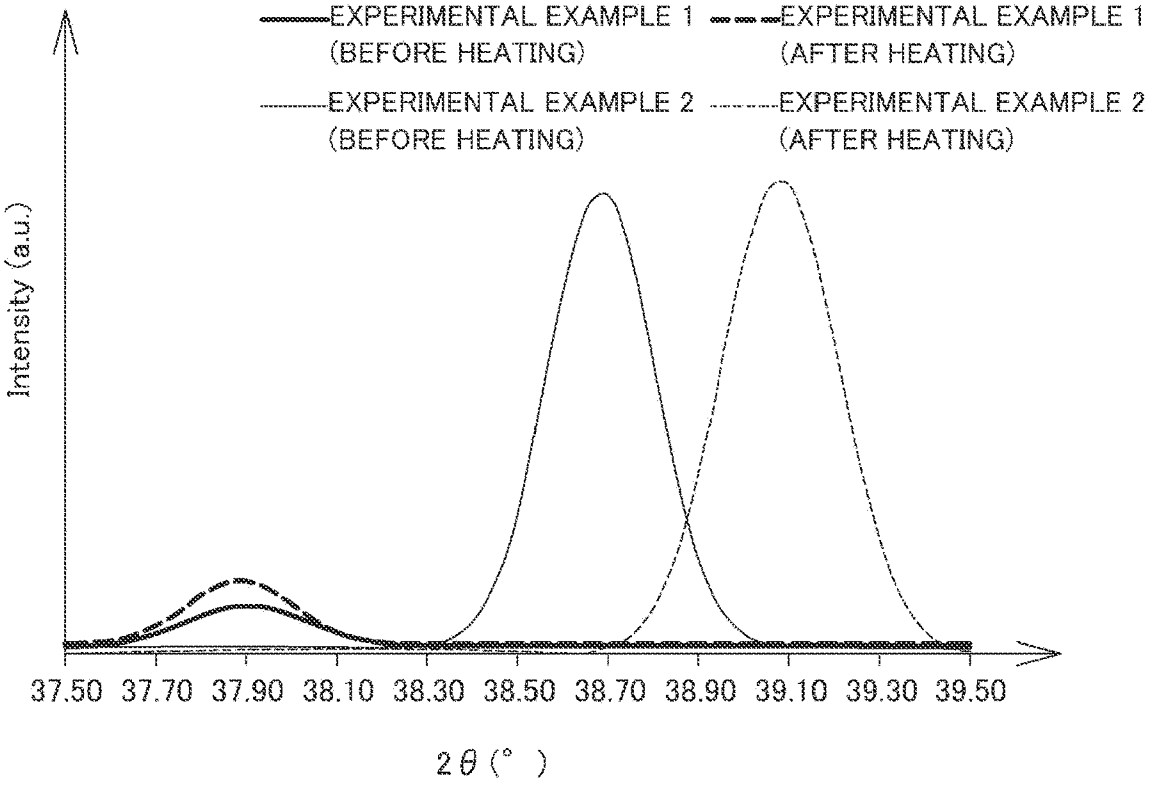
FIG. 4 is a graph showing X-ray diffraction patterns before and after heating in experimental examples 1 and 2.
Figure 5:
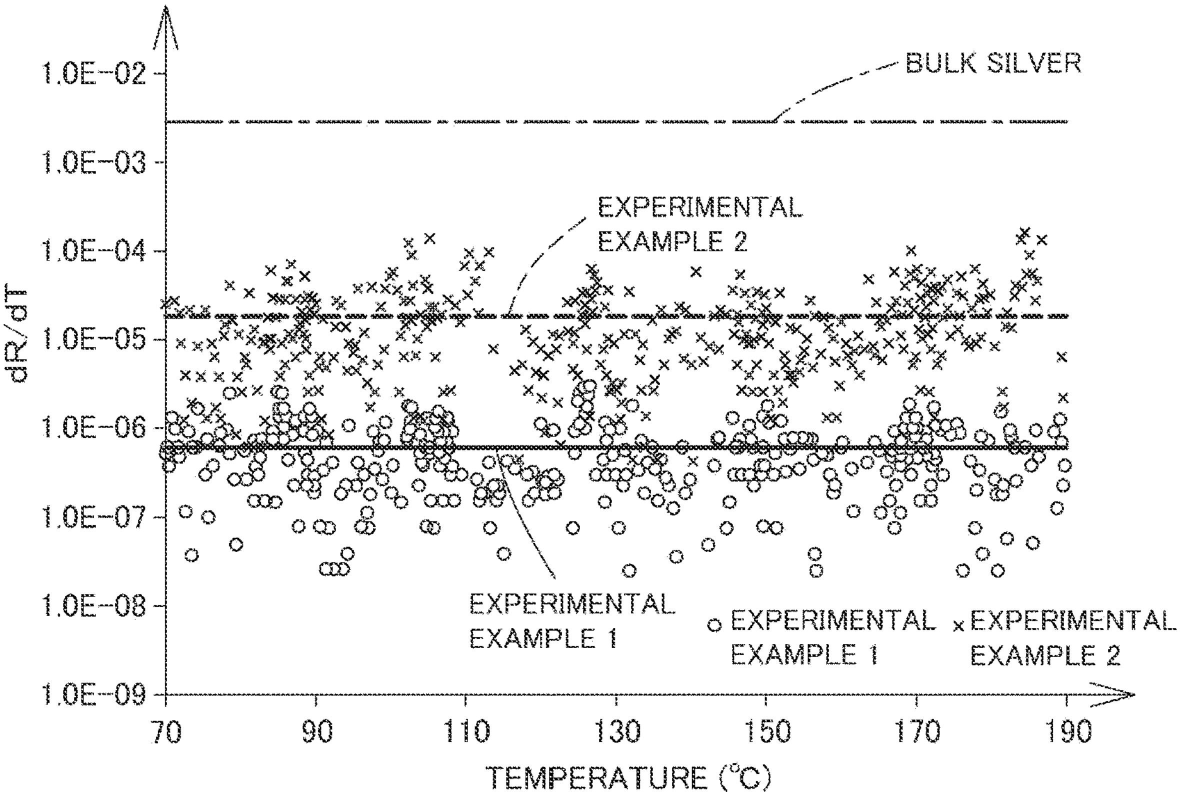
FIG. 5 is a graph of temperature coefficients with respect to temperature in experimental examples 1 and 2.
Figure 6:
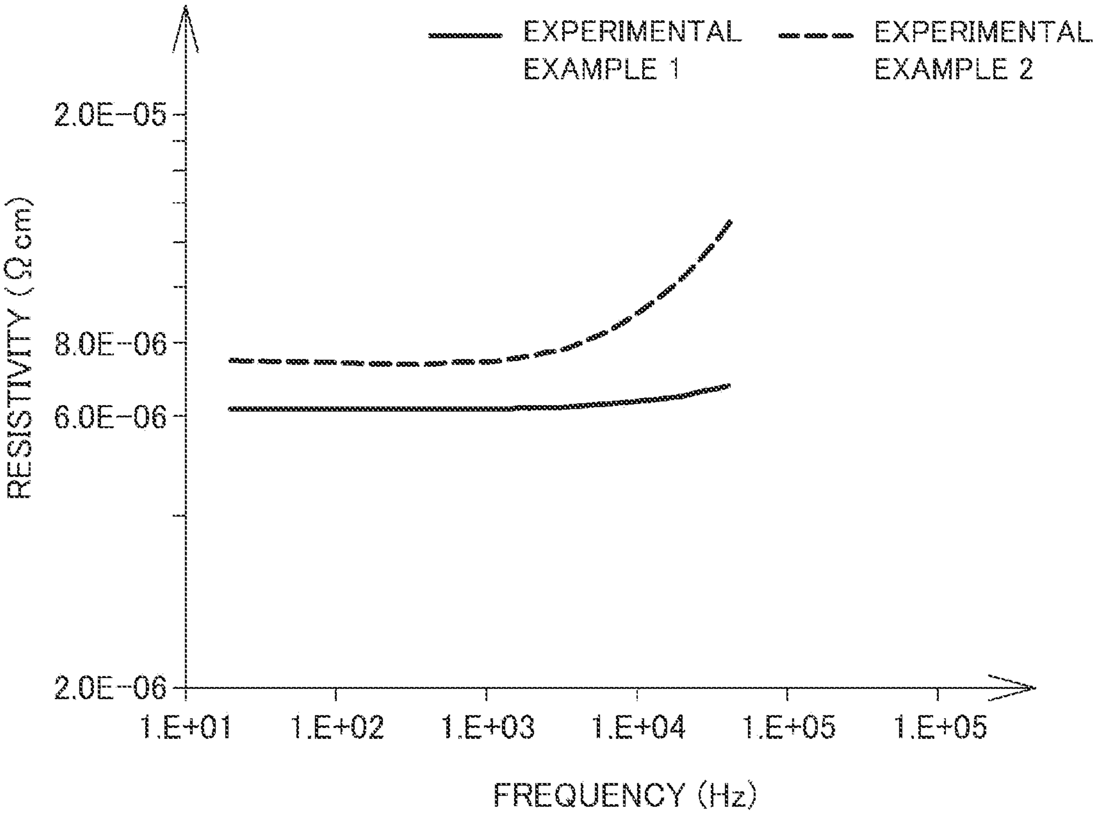
FIG. 6 is a graph showing changes in resistivity with respect to frequency in experimental examples 1 and 2.

A diffraction peak in the powder X-ray diffraction measurement is shown in FIG. 4, a graph of a temperature coefficient at each measurement temperature in the temperature coefficient test is shown in FIG. 5, and a graph of electrical resistivity with respect to each frequency in the spectroscopic ellipsometry measurement is shown in FIG. 6.

Lattice constants and crystallite diameters before and after heating obtained by the powder X-ray diffraction measurement and average temperature coefficients obtained by the temperature coefficient test are shown in Table 1.

the temperature range from 70° C. to 190° C. as compared with bulk silver at room temperature.

The average temperature coefficient in the experimental example 1 is $7.14\times10^{-7}$ Ω/K as shown in Table 1, which is an extremely low value of 0.02 times the average temperature coefficient in the experimental example 2.

This confirms that in the experimental example 1, there is smaller change in resistivity with respect to temperature change and more thermal stability than in the experimental example 2.

In the experimental example 2, as shown in FIG. 6, resistivity greatly increased with an increase in frequency from around 1 kHz, whereas in the experimental example 1, resistivity is approximately constant even when the frequency increased.

TABLE 1

| | Lattice constant (nm) | | | Crystallite diameter (nm) | | | Average temperature |
|---|---|---|---|---|---|---|---|
| | Before heating | After heating | Change rate | Before heating | After heating | Change rate | coefficient (Ω/K) |
| Experimental Examle 1 | 0.238 | 0.238 | 1.000 | 0.347 | 0.398 | 1.147 | $7.14\times10^{-7}$ |
| Experimental Examle 2 | 0.234 | 0.231 | 0.987 | 0.396 | 0.361 | 0.912 | $3.55\times10^{-5}$ |

In the experimental example 1 and the experimental example 2, peaks originating from the (111) plane of Ag are detected in a range of 37.50° to 39.50°, respectively, as shown in FIG. 4, indicating that a silver thin film layer is formed on the glass substrate.

As shown in FIG. 4, the peak of the (111) plane of the experimental example 1 shifted to a lower angle side as compared with the peak of the (111) plane of the experimental example 2.

In the peak of the (111) plane in the experimental example 1 after heating, the peak intensity is higher and shifted slightly to a lower angle side as compared with the peak of the (111) plane in the experimental example 1 before heating, whereas in the peak of the (111) plane in the experimental example 2 after heating, the peak intensity is slightly higher and shifted to a higher angle side as compared with the peak of the (111) plane in the experimental example 2 before heating.

In the experimental example 1, as shown in Table 1, the lattice constant is constant and the crystallite diameter increases after heating as compared with before heating. This increase in crystallite diameter is considered to be due to the growth of the particles, and the constant lattice constant suggests that the structure is stable with respect to heat.

On the other hand, in the experimental example 2, as shown in Table 1, the lattice constant decreases and the crystallite diameter decreases after heating as compared with before heating. This is considered to be due to the influence of thermal strain due to residual stress.

The temperature coefficient in the experimental example 1 is distributed as indicated by circles in FIG. 5, and is less than 0.00001 at any temperature within a temperature range from 70° C. to 190° C., and at any temperature within the temperature range from 70° C. to 190° C., the temperature coefficient is smaller than the temperature coefficient ($4\times10^{-3}$ Ω/K) of bulk silver at room temperature, and the average temperature coefficient is also $1.7\times10^{-4}$ times smaller than the temperature coefficient ($4\times10^{-3}$ Ω/K) of bulk silver.

This suggests that there is a smaller temperature coefficient and more thermal stability at any temperature within In the experimental example 1, resistivity is $7.0\times10^{-6}$ Ωcm or less at 20 Hz to 40 kHz.

In the experimental example 1, the resistivity at 10 kHz is 1.1 times or less the resistivity at 1 kHz.

This indicates that resistivity is less affected by change in frequency and less frequency-dependent in the experimental example 1.

The above is summarized as follows.

(1) According to the results of the XRD measurement, a peak originating from silver of the (111) plane is confirmed in the experimental example 1, and it is found that silver oxide can be reduced even at a low temperature of 150° C. and a silver layer having high thermal conductivity and thermal diffusivity can be formed.

(2) According to the results of the XRD measurement, it is suggested that the lattice constant is constant and the crystallite diameter slightly increases after heated at 150° C. for 30 minutes as compared with before heating, and the structure is stable to heat.

(3) According to the results of the temperature coefficient test, it is found that the temperature coefficient in the range from 70° C. to 190° C. is much smaller than that of bulk silver, and is less than 0.00001 at any temperature within the temperature range from 70° C. to 190° C., and the resistivity hardly depends on the temperature, and thermal stability is high.

(4) According to the results of spectroscopic ellipsometry measurement, it is found that the resistivity is almost constant with respect to change in frequency, the resistivity at 10 kHz is 1.1 times or less with respect to the resistivity at 1 kHz, and the resistivity has low frequency dependence even in a high frequency range.

Experimental Example 3

In the experimental example 1, first, as a pretreatment step, toluene (manufactured by Wako Co., Ltd., super dehydration) and a silver oxide powder (manufactured by FUJIFILM Wako Pure Chemical Corporation, special grade silver oxide, maximum particle size 10 μm) are put in a closed container and stirred.

Thereafter, decantation is performed three times to extract the toluene, followed by drying the silver oxide in a dryer at 100° C. to volatilize and substantially remove the toluene.

Subsequently, 100 parts by weight of the silver oxide from which the toluene has been removed and 100 parts by weight of liquid Bis sebacate (1,2,2,6,6-pentamethyl-4-piperidyl; manufactured by ADEKA Corporation, ADK STAB LA-72) are mixed to obtain a paste-like mixture.

The experimental example 3 is prepared in the same manner as in the experimental example 1 except for the above.

Experimental Example 4

The experimental example 4 is prepared in the same manner as in the experimental example 3 except that solid Bis sebacate (2,2,6,6-tetramethyl-4-piperidyl; manufactured by ADEKA Corporation, ADK STAB LA-77Y; melting point: 82° C. to 87° C.) is used as the reducing agent.

(SEM Observation)

A cross-section of each of the silver electrodes in the experimental examples 3 and 4 is subjected to SEM observation with a field emission scanning electron microscope (FE-SEM) (manufactured by JEOL Ltd., JSM6700F).

Figure 7A:
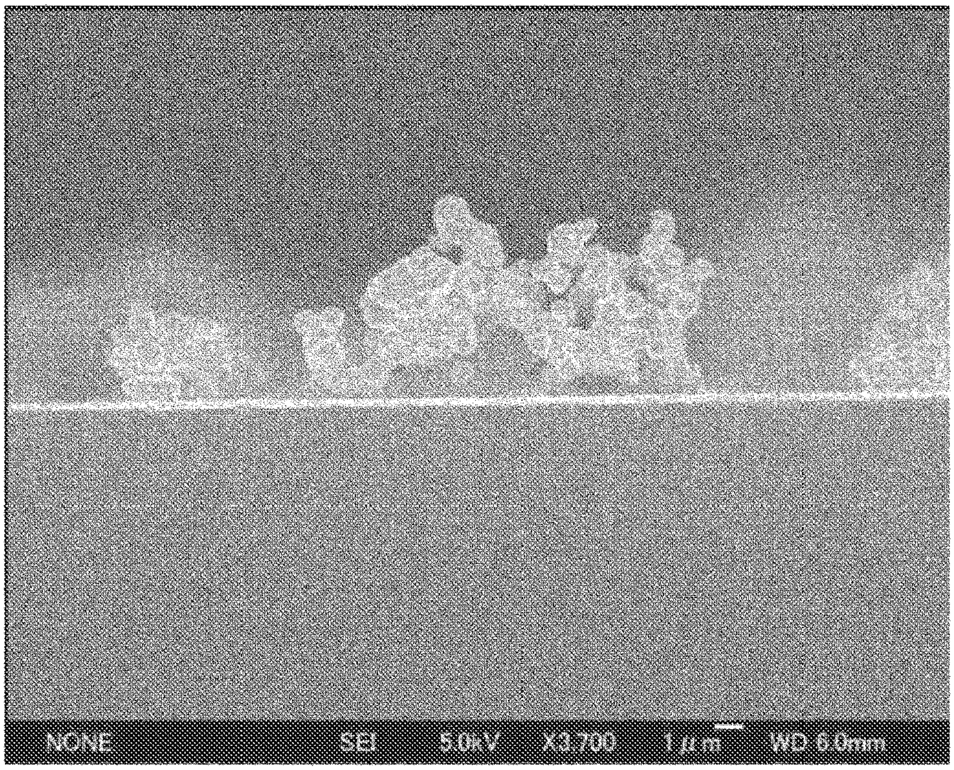
Figure 7B:
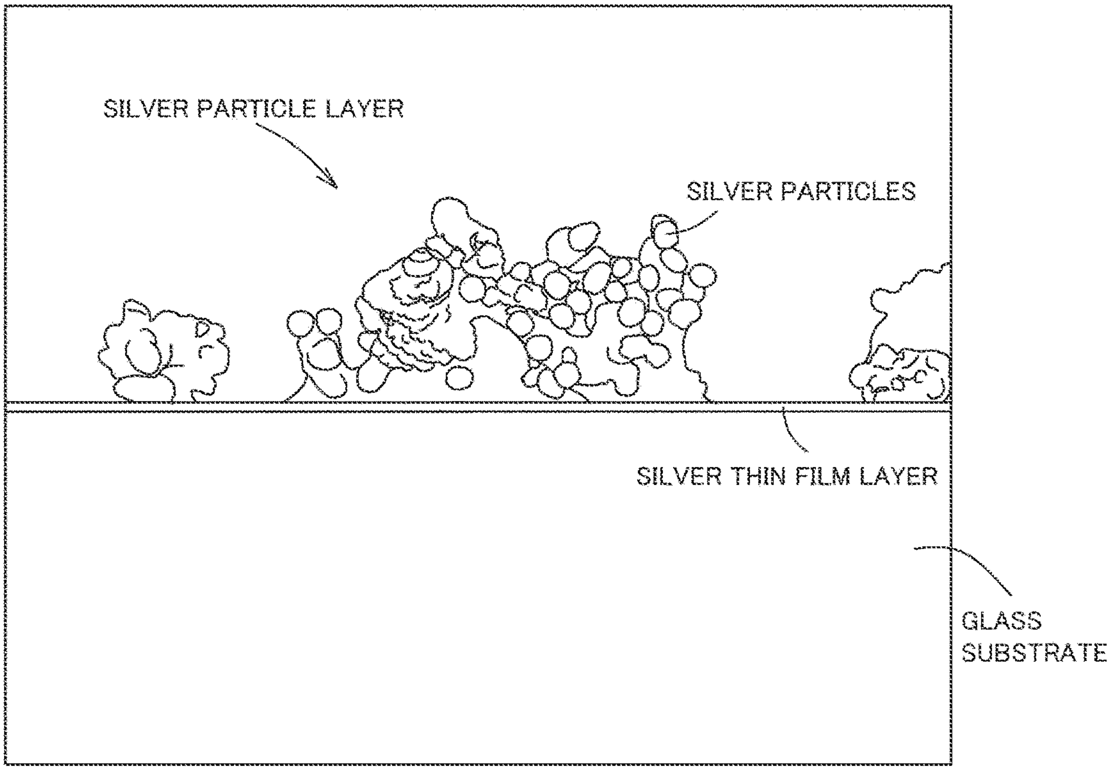

FIG. 7A shows an SEM image in the experimental example 3, and FIG. 7B shows a trace of the SEM image in FIG. 7A.

In the experimental example 3, as shown in FIGS. 7A and 7B, a uniform silver thin film layer of about 220 nm to 280 nm is confirmed, and a silver particle layer on which silver particles of about several micrometers are locally deposited is also confirmed.

Similarly, in the experimental example 4, when SEM observation is performed, a silver thin film layer is confirmed, and a silver particle layer on which silver particles of about several micrometers are locally deposited is also confirmed.

According to these results, it is confirmed that by using the N—CH3 type hindered amine light stabilizer or the N—H type hindered amine light stabilizer as the reducing agent, the silver oxide on the glass substrate can be reduced to form a nano-order silver thin film layer.

In addition, since a silver particle layer on which silver particles of about several micrometers are locally deposited is confirmed, it is suggested that silver oxide particles having a certain particle size or larger are not melted to form a silver thin film layer, but are reduced to silver while maintaining the shape, and crystal growth occurred.

Experimental Example 5

The experimental example 5 is prepared in the same manner as in the experimental example 3 except that distilled water is used as the pretreatment solvent.

Experimental Example 6

The experimental example 6 is prepared in the same manner as in the experimental example 3 except that the pretreatment step is not performed.

(Reaction Time Test)

In the experimental examples 3, 5, and 6, the temperature change and the resistance change in the heating step are measured, and the reaction time and the resistance value change from the heating start time are observed.

The resistance change is measured by a 4-terminal 4-end needle method using Loresta GP (MCP-T610) manufactured by Mitsubishi Chemical Analytech Co., Ltd.

Figure 8:
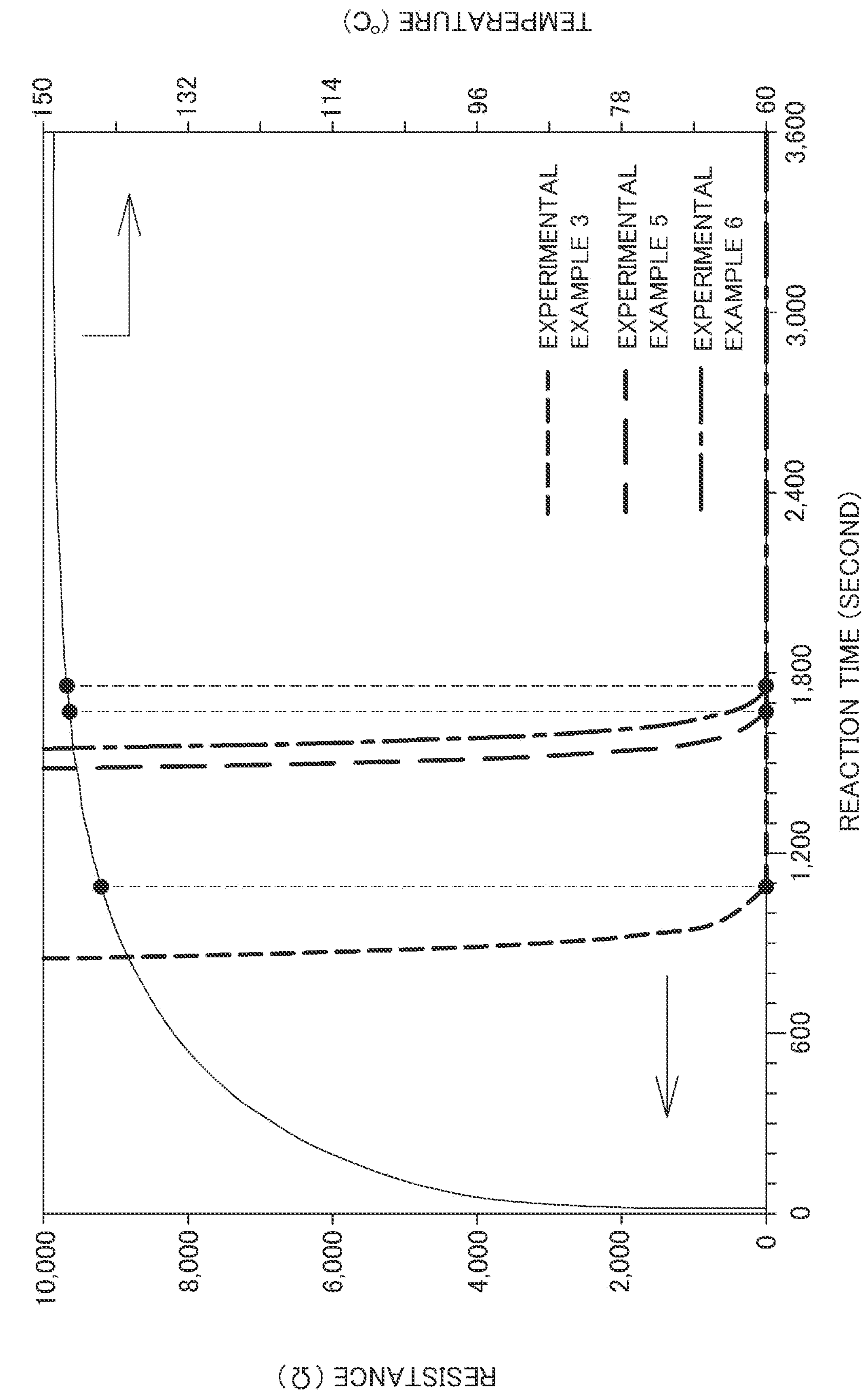
FIG. 8 is a graph of resistance and temperature with respect to reaction time in experimental examples 3, 5, and 6.

The results of the reaction time test are shown in FIG. 8.

In the experimental example 3, as shown in FIG. 8, the resistance value becomes almost 0 at a reaction time of about 1090 seconds, suggesting that silver oxide has been decomposed to form a silver thin film layer. In the experimental example 3, it is suggested that the silver thin film layer is formed when the heating temperature raises to about 143° C.

In the experimental example 5, the resistance value becomes almost 0 at a reaction time of about 1680 seconds, suggesting that silver oxide has been decomposed to form a silver thin film layer.

In the experimental example 6, the resistance value becomes almost 0 at a reaction time of about 1760 seconds, suggesting that silver oxide has been decomposed to form a silver thin film layer.

In the experimental example 3 in which the pretreatment is performed with an organic solvent, the time until the silver thin film layer is formed is shortened by about 38% as compared with the experimental example 6 in which the pretreatment is not performed, and in the experimental example 5 in which the pretreatment is performed with water, the time until the silver thin film layer is formed is shortened by about 5% as compared with the experimental example 6 in which the pretreatment is not performed.

In the experimental example 3 in which the pretreatment is performed with an organic solvent, the time until the silver thin film layer is formed is shortened by about 35% as compared with the experimental example 5 in which the pretreatment is performed with water.

According to these results, it is found that by immersing the silver oxide in the pretreatment solvent, impurities on the surface of the silver oxide are removed, the growth start time of the silver particles is advanced as compared with a case where the silver oxide is not subjected to the pretreatment, and the rate of forming the silver thin film layer is increased as a whole. In particular, it is found that the rate of forming the silver thin film layer is dramatically increased by using an organic solvent as the pretreatment solvent.

It is suggested that by using an organic solvent as the pretreatment solvent, the silver thin film layer can be formed at a lower heating temperature.

Experimental Example 7

Silver is vapor-deposited on the glass substrate at a vapor deposition rate of approximately 0.1 to 0.3 nm/sec under a reduced pressure vacuum of $1\times10^{-4}$ Pa or higher to form a silver thin film layer.

The silver electrode thus obtained is designated as the experimental example 7.

(Corrosion Resistance Test)

In the experimental examples 3 and 7, heating is performed in air at 190° C. for 1 hour and changes before and after heating are checked.

In the experimental example 7, discoloration is observed at an end portion, whereas in the experimental example 3, discoloration is not observed. This indicates that, in the experimental example 3, the presence of a protective layer having a 1,2,2,6,6-pentaalkylpiperidinyl group derived from the reducing agent suppresses surface corrosion.

When the silver thin film layer of the silver electrode in the experimental example 7 is scraped with a nail, the silver thin film is easily peeled from the glass substrate, whereas when the silver thin film layer of the silver electrode in the experimental example 3 is scraped with a nail with a similar force, the silver thin film is not peeled from the glass substrate.

This indicates that the presence of the protective layer improves the adhesion between the silver thin film layer and the glass substrate, and also increases the layer strength of the silver thin film layer.

Experimental Example 8

The experimental example 8 is prepared in the same manner as in the experimental example 1 except that a copper substrate is used as the substrate instead of the glass substrate.

Experimental Example 9

The experimental example 9 is prepared in the same manner as in the experimental example 2 except that a copper substrate is used as the substrate instead of the glass substrate.

(STEM Observation)

In the experimental example 8, a cross section is processed by a focused ion beam (FIB), and the cross section is subjected to STEM observation with a scanning transmission electron microscope (STEM) (manufactured by Hitachi High-Technologies Corporation, HD-2700) and elemental analysis with energy dispersive X-ray spectroscopy (EDX).

An electron beam diffraction image is observed in the experimental example 8, a simulation of the electron beam diffraction image is performed on the basis of a crystal database of Mat Navi (https://mits.nims.go.jp/), and the electron beam diffraction image in the example 7 is superimposed on a simulation pattern to perform identification.

Figure 9A:
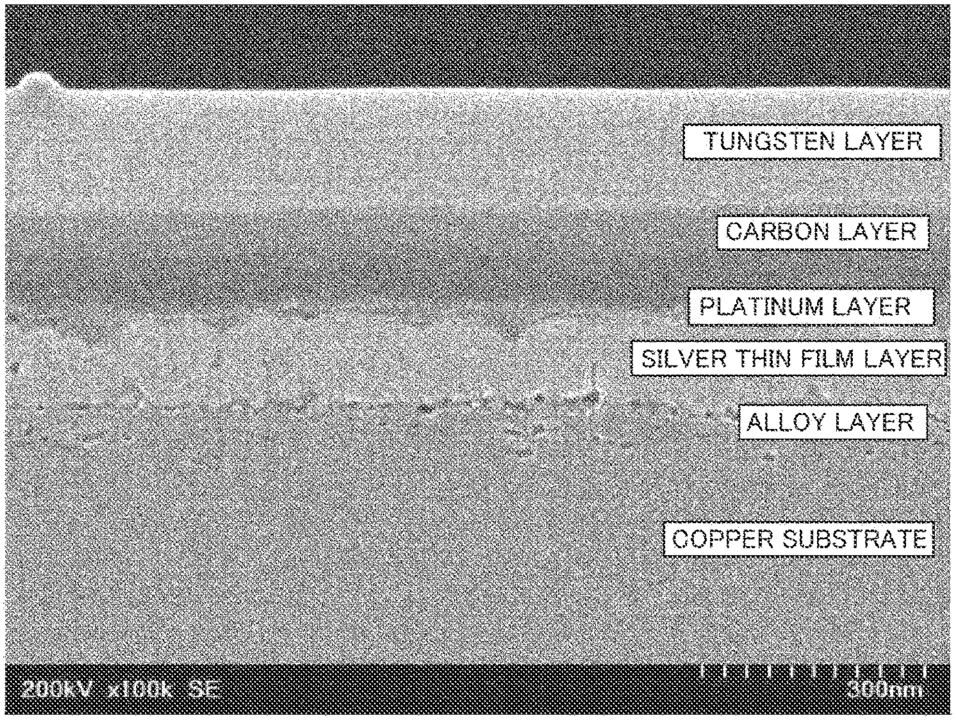
Figure 9B:
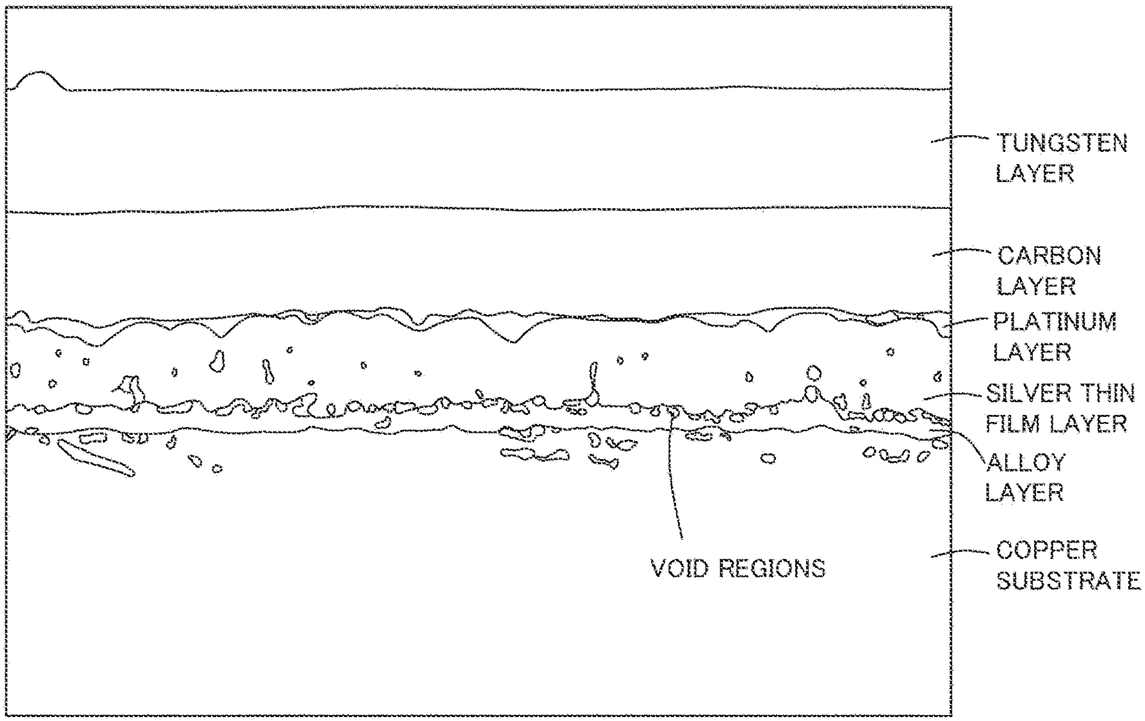

FIG. 9A shows a secondary electron image (hereinafter, also referred to as SE image) of STEM at a low magnification in the experimental example 8, and FIG. 9B shows a trace of the SE image in FIG. 9A.

Figure 10A:
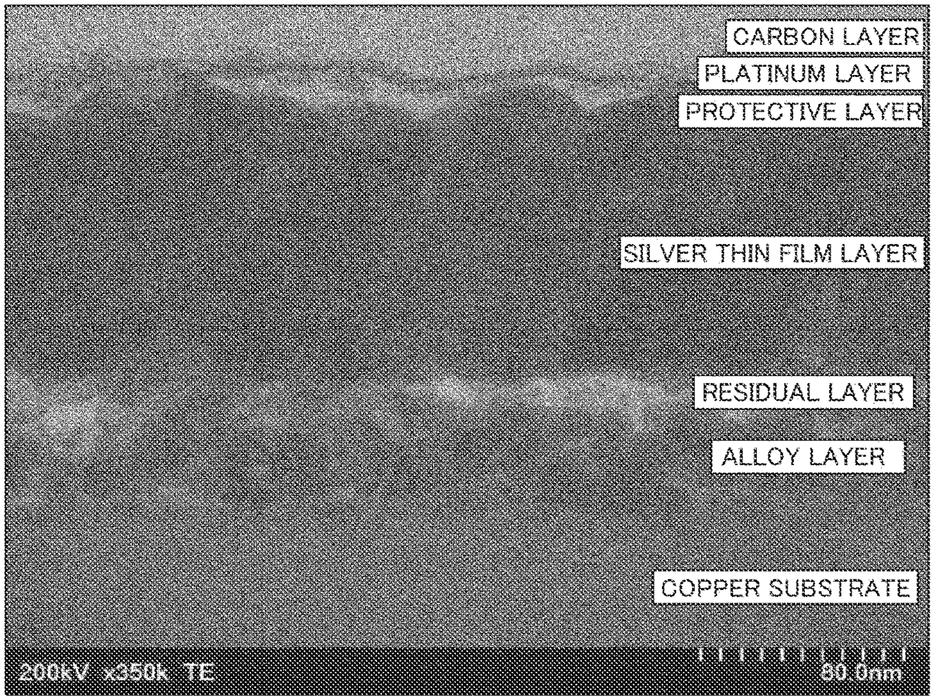
Figure 10B:
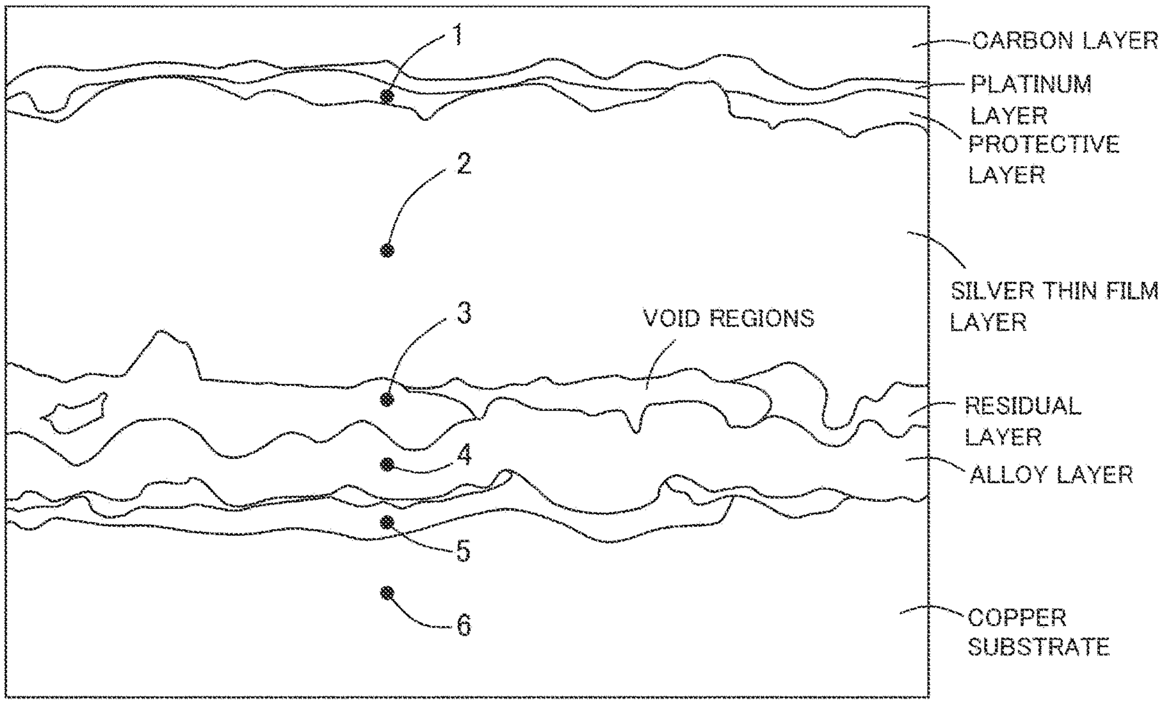

FIG. 10A shows a transmitted electron image (hereinafter, also referred to as TE image) of STEM at a high magnification in the experimental example 8, and FIG. 10B shows a trace of the TE image in FIG. 10A.

In the experimental example 8, when the SE image is observed as shown in FIGS. 9A and 9B, an alloy layer of silver and copper is confirmed between the copper substrate and the silver thin film layer, and a plurality of void regions are formed on the silver thin film layer side of the alloy layer.

Similarly, in the experimental example 9, when the SE image is observed, an alloy layer of silver and copper is confirmed between the copper substrate and the silver thin film layer, and a plurality of void regions are formed on the silver thin film layer side of the alloy layer.

In the experimental example 8, when a high magnification TE image is observed as shown in FIGS. 10A and 10B, an alloy layer of silver and copper is confirmed between the copper substrate and the silver thin film layer, and a protective layer having several nanometers to several tens of nanometers derived from the reducing agent is confirmed on the surface of the silver thin film layer. A residual layer (light metal layer) is confirmed between the alloy layer and the silver thin film layer.

Elemental analysis by EDX is performed at measurement points 1 to 6 shown in FIG. 10B. As a result, at the measurement point 2 corresponding to the position of the silver thin film layer, a peak of silver is detected, but no peaks of carbon and nitrogen are detected, and on the other hand, at the measurement point 1 corresponding to the position of the protective layer, not only a peak of silver but also peaks of carbon and nitrogen are detected.

At the measurement point 4 corresponding to the alloy layer, peaks of silver, copper, and carbon are detected, but no peak of nitrogen is detected. At the measurement point 3 corresponding to the position of the residual layer, similarly to the measurement point 4, peaks of silver, copper, and carbon are detected, but no peak of nitrogen is detected. In addition, a higher peak of carbon is detected than that at the measurement point 4, with a higher amount detected.

At the measurement point 5 corresponding to the position of the interface between the alloy layer and the copper substrate and the measurement point 6 corresponding to the position of the copper substrate, a peak of copper is detected, but no peak of nitrogen is detected.

In the experimental example 8, when electron beam diffraction is performed at the measurement point 4 shown in FIG. 10B and an electron beam diffraction image is observed, a pattern of the electron beam diffraction image is substantially consistent with a simulation pattern of a copper-silver alloy in which a copper component and a silver component are 1 to 1.

The simulation pattern of the copper-silver alloy is calculated based on the crystal structure (crystal structure with a space group number 225 and a space group Fm-3 m (here, a=0.38765 nm, b=0.38765 nm, c=0.38765 nm, $\alpha$=90°, $\beta$=90°, $\gamma$=90°)).

According to the result at the measurement point 1, a peak of nitrogen and a peak of carbon are detected, and therefore it is presumed that a residue of the reducing agent is bled out on the surface of the silver thin film layer by heating, and a protective layer containing a compound having a 1,2,2,6,6-pentaalkylpiperidinyl group derived from the reducing agent is formed on the silver thin film layer.

According to the result at the measurement point 4, a large amount of carbon is detected in the adjacent silver thin film layer or alloy layer, and a portion having a light color with respect to the alloy layer and the silver thin film layer is confirmed between the alloy layer and the silver thin film layer in the TE image. Therefore, it is presumed that a light metal layer resulted from oxidation and decomposition of the reducing agent is formed as a residual layer between the silver thin film layer and the alloy layer.

The above is summarized as follows.

(1) According to the results of SEM observation and STEM observation, it is found that by using the N—CH3 type hindered amine light stabilizer having a 1,2,2,6,6-pentaalkylpiperidinyl group or the N—H type hindered amine light stabilizer having a 2,2,6,6-tetraalkylpiperidinyl group as the reducing agent, the silver oxide on the copper substrate can be reduced to form a nano-order silver thin film layer.

(2) According to the results of the reaction time test, it is found that the reaction time for formation of the silver thin film layer is shortened by performing the pretreatment with the pretreatment solvent before the heating step. In particular, it is found that the reaction time is significantly shortened by using an organic solvent as the pretreatment solvent.

(3) According to the results of the corrosion resistance test, it is found that a silver thin film having higher corrosion resistance than a silver thin film layer formed by vacuum vapor deposition is formed by using a hindered amine light stabilizer as the reducing agent.

(4) According to the results of STEM observation, it is confirmed that by using a hindered amine light stabilizer as the reducing agent, the silver oxide on the copper substrate can be reduced to form a silver thin film layer, the protective layer is formed on the surface of the silver thin film layer, and the residual layer is formed on the surface of the alloy layer. According to the results of EDX analysis, it is suggested that the protective layer on the surface of the silver thin film layer and the residual layer in the interface between the silver thin film layer and the alloy layer are derived from the reducing agent.

EXPLANATION OF REFERENCE CHARACTERS

1, 101: silver electrode
2: substrate
3: silver thin film layer (silver layer)
5: silver particle layer
6: protective layer
10: silver particles
102: copper plate (copper body, substrate)
103: alloy layer
106: residual layer
108: void region

The invention claimed is:

1. A silver electrode comprising a substrate and a silver layer laminated on the substrate,
- the silver electrode having one peak in a range of diffraction angle 2θ=37.5° to 38.3° in an X-ray diffraction pattern measured by an X-ray diffractometer using a CuKα1 ray,
- wherein a change rate of the diffraction angle of the peak after heated at 150° C. for 30 minutes is less than or equal to 0.5%,
- wherein the silver electrode further comprises:
  - a protective layer including at least one of a 1,2,2,6,6-pentaalkylpiperidinyl group and a 2,2,6,6-tetraalkylpiperidinyl group; and
  - a cross sectional structure in which the protective layer covers a surface of the silver layer.

2. The silver electrode according to claim 1, wherein both a temperature coefficient at 70° C. and a temperature coefficient at 190° C. are less than 0.00001 (Ohm/Kelvin).

3. The silver electrode according to claim 2, wherein a temperature coefficient in a range from 70° C. to 190° C. is less than 0.00001 (Ohm/Kelvin).

4. The silver electrode according to claim 1, wherein a resistivity at a frequency of 10 kHz is 1.1 times or less compared with a resistivity at a frequency of 1 kHz.

5. The silver electrode according to claim 1, further comprising silver particles on the silver layer, the silver particles having an average particle size larger than an average film thickness of the silver layer.

6. The silver electrode according to claim 1, wherein an average film thickness of the silver layer is 500 nm or less.

7. A silver electrode according to claim 1, comprising a substrate and a silver layer laminated on the substrate,
- the silver electrode having one peak in a range of diffraction angle 2θ=37.5° to 38.3° in an X-ray diffraction pattern measured by an X-ray diffractometer using a CuKα1 ray,
- wherein a change rate of the diffraction angle of the peak after heated at 150° C. for 30 minutes is less than or equal to 0.5%,
- wherein an oxidizing agent including silver is reduced by a reducing agent including an organic compound with the oxidizing agent in contact with the substrate, thereby the silver layer being laminated on the substrate,
- wherein the substrate is a copper body,
- wherein an alloy layer including a copper component and a silver component is formed in an interface between the substrate and the silver layer, and
- wherein a protective layer including a component of the reducing agent is laminated on a surface of the silver layer.

8. The silver electrode according to claim 7, wherein a residual layer including a component derived from the reducing agent is formed in an interface between the alloy layer and the silver layer.

* * * * *